US008295232B2

(12) United States Patent
Harada et al.

(10) Patent No.: US 8,295,232 B2
(45) Date of Patent: Oct. 23, 2012

(54) BASE STATION AND SCHEDULING METHOD

(75) Inventors: Atsushi Harada, Kawasaki (JP); Minami Ishii, Yokohama (JP); Sadayuki Abeta, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 199 days.

(21) Appl. No.: 12/305,896

(22) PCT Filed: Jun. 19, 2007

(86) PCT No.: PCT/JP2007/062351
§ 371 (c)(1),
(2), (4) Date: Apr. 10, 2009

(87) PCT Pub. No.: WO2007/148704
PCT Pub. Date: Dec. 27, 2007

(65) Prior Publication Data
US 2010/0142453 A1 Jun. 10, 2010

(30) Foreign Application Priority Data

Jun. 19, 2006 (JP) ................................. 2006-169437

(51) Int. Cl.
*H04W 4/00* (2009.01)
*H04B 15/00* (2006.01)
*G06F 11/00* (2006.01)
(52) U.S. Cl. ..................... 370/329; 455/452.1; 455/509; 714/750
(58) Field of Classification Search .................. 370/329, 370/322, 345, 348, 458; 714/748, 750; 455/452.1, 455/509
See application file for complete search history.

(56) References Cited

U.S. PATENT DOCUMENTS

| 2006/0234716 A1* | 10/2006 | Vesterinen et al. | 455/450 |
| 2007/0025391 A1* | 2/2007 | Yonge et al. | 370/458 |
| 2007/0133458 A1* | 6/2007 | Chandra et al. | 370/329 |
| 2007/0189205 A1* | 8/2007 | Terry et al. | 370/328 |
| 2007/0245201 A1* | 10/2007 | Sammour et al. | 714/748 |
| 2007/0291691 A1* | 12/2007 | Gorokhov | 370/329 |
| 2009/0022098 A1* | 1/2009 | Novak et al. | 370/329 |

FOREIGN PATENT DOCUMENTS

JP 2004-336112 A 11/2004

OTHER PUBLICATIONS

International Search Report w/translation from PCT/JP2007/062351 dated Aug. 14, 2007 (2 pages).

(Continued)

*Primary Examiner* — Michael Thier
*Assistant Examiner* — Awet Haile
(74) *Attorney, Agent, or Firm* — Osha Liang LLP

(57) ABSTRACT

A base station (100) includes: a scheduling unit (106) configured to use, for a particular radio bearer, any one of a persistent scheduling in which data addressed to a mobile station (200) is transmitted at a predetermined timing, and a non-persistent scheduling in which a transmission opportunity is assigned to data addressed to a mobile station having a favorable reception condition; a control information generating unit (110) configured to generate control information to be used in the persistent scheduling; a control information notifying unit (112) configured to notify, to the mobile station, the control information; and a switching notifying unit (112) configured to notify, to the mobile station (200), that a scheduling to be used for the particular bearer should be switched from the non-persistent scheduling to the persistent scheduling, wherein the scheduling unit (106) is configured to switch the scheduling to be used for the particular radio bearer, from the non-persistent scheduling to the persistent scheduling, based on a reception condition of the control information in the mobile station (200).

8 Claims, 6 Drawing Sheets

OTHER PUBLICATIONS

Written Opinion from PCT/JP2007/062351 dated Aug. 14, 2007 (3 pages).
Patent Abstracts of Japan; Publication No. 2004-336112; Publication Date Nov. 25, 2004; NEC Corp. (1 page).
TSG-RAN WG1 LTE AdHoc; R1-060099; "Persistent Scheduling for E-UTRA"; Helsinki, Finland, Jan. 23-25, 2006 (2 pages).
3GPP TSG-RAN WG1 LTD AdHoc; R1-060173; "Considerations for control signalling support of Real Time Services"; Helsinki, Finland, Jan. 23-25, 2006, pp. 1-5 (5 pages).
3GPP TSG-RAN WG2 meeting #51; R2-060550; "Further details on HS-SCCH-less operation for VoIP traffic"; Denver, Colorado, Feb. 13-17, 2006; pp. 1-7 (7 pages).
Office Action for Japanese Patent Application No. 2008-522480 mailed Apr. 10, 2012, with English translation thereof (5 pages).
3GPP TSG RAN WG1 meeting#45; Tdoc R1-061485; "CQI Signalling Occasions"; Shanghai, China; May 8, 2006 (2 pages).
3GPP TR 25.814 V1.5.0 Release 7; Technical Specification Group Radio Access Network; May 2006 (5 pages).

* cited by examiner

FIG. 2

| | Field | Size | Comment |
|---|---|---|---|
| Cat.1 (Resource indication) | ID (UE or group specific) | 8-9 | Indicates the UE (or group of UEs) for which the data transmission is intended |
| | Resource assignment | FFS | Indicates which (virtual) resource units (and layers in case of multi-layer transmission) the UE(s) shall demodulate. |
| | Duration of assignment | 2-3 | The duration for which the assignment is valid, could also be used to control the TTI or persistent scheduling. |
| Cat. 2 (transport format) | Multi-antenna related information | FFS | Content depends on the MIMO/beamforming schemes selected. |
| | Modulation scheme | 2 | QPSK, 16QAM, 64QAM.. In case of multi-layer transmission, multiple instances may be required. |
| | Payload size | 6 | Interpretation could depend on e.g. modulation scheme and the number of assigned resource units (c.f. HSDPA). In case of multi-layer transmission, multiple instances may be required. |
| Cat. 3 (HARQ) | If asynchronous hybrid ARQ is adopted | Hybrid ARQ process number | 3 | Indicates the hybrid ARQ process the current transmission is addressing |

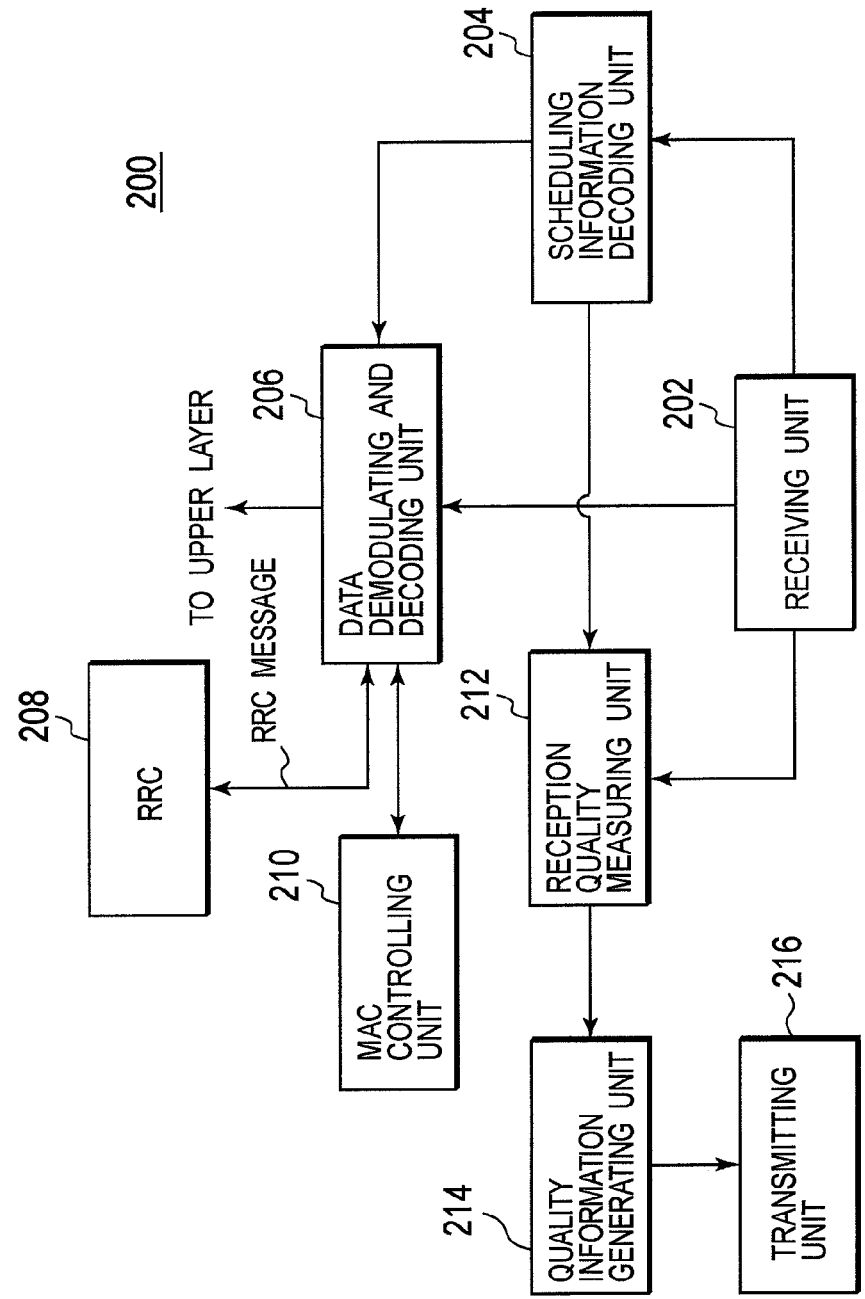

BASE STATION AND SCHEDULING METHOD

TECHNICAL FIELD

The present invention relates to a base station and a scheduling method.

BACKGROUND ART

In the real-time service, application characteristics, for example, characteristics of VoIP (Voice over Internet Protocol) or the like is mapped to each radio bearer (RB), as a QoS-related attribute. Accordingly, it is assumed that an estimation of the application type is not performed in the MAC layer.

HSDPA (High Speed Downlink Packet Access) is configured such that, at each TTI (Transmission Time Interval) via an HS-SCCH (High speed-Shared Control Channel), a mobile station is notified of an assignment of a transmission opportunity to the downlink data that is addressed to the mobile station. More specifically, in the HSDPA, the HS-SCCH is transmitted before the downlink data is transmitted, so that a mobile station is notified of assignment information (scheduling information) for the downlink data in advance. The mobile station that detects that a transmission opportunity is assigned to the downlink data addressed to the own mobile station performs a decoding process for the downlink data, based on the assignment information (the scheduling information) for the downlink data.

However, the data is transmitted, for example, once in every tens ms in a characteristic traffic such as a voice traffic. Accordingly, when a configuration is employed in which the assignment of the transmission opportunity to the data is notified via a channel equivalent to the HS-SCCH, overhead of a signaling channel is made too large to achieve efficiency.

In this regard, in standardization of evolved UTRA, "persistent scheduling" is proposed, in which the transmission opportunity is assigned to the data to be used for the application, based on a predetermined period according to the characteristics of the application.

For example, in the "persistent scheduling", as an attribute of a radio bearer, "whether or not the persistent scheduling can be applied (assignment period)" is set.

Here, the assignment period can be set in a frame unit (N×10 msec: N is an integer of N>0). When the assignment period is "0," "persistent scheduling" is not applied.

In the "evolved UTRA," when data having a known traffic pattern (such as VoIP or the like) is transmitted and when the assignment information (scheduling information) for the downlink data is transmitted via a signaling channel equivalent to the HS-SCCH in the HSDPA, overhead of the signaling channel is increased.

In addition, in the "evolved UTRA," when the number of users (mobile stations) using the VoIP is increased, the overhead of the signaling channel is relatively increased. Accordingly, a system capacity may be consumed.

For this reason, as described above, there has been proposed "persistent scheduling". In the persistent scheduling, the transmission frequency of the scheduling information transmitted via the signaling channel equivalent to the HS-SCCH in the HSDPA can be reduced, when the data having a known traffic pattern (such as VoIP or the like) is transmitted. There has been also proposed combined use of the "persistent scheduling" and "normal scheduling". In the normal scheduling, the transmission opportunity is assigned, at each TTI, to the data addressed to a user (mobile station) having a favorable radio channel condition.

However, the above-described background art has the following problems.

It can be considered a case where a reception quality in an L1/L2 control channel equivalent to the HS-SCCH in the HSDPA is temporarily deteriorated greatly owing to such as a shadowing, a high-speed movement, or the like. In this case, the mobile station cannot receive the assignment information (scheduling information) for the data to be transmitted via the L1/L2 control channel, even when data addressed to the own mobile station exists.

In addition, in a system to which a next generation system "UTRA-UTRAN LTE (Long Term Evolution)" is applied, it is assumed that a plurality of symbols from the beginning of one sub-frame is assigned for the L1/L2 control channel. However, a radio resource that can be assigned to the L1/L2 control channel is limited. Accordingly, the reception quality in the L1/L2 control channel cannot be improved sufficiently.

Meanwhile, in a case of a data channel, an error resilience can be enhanced by changing a coding ratio of the data to be transmitted, and, for example, by coding the data at a low coding ratio. In addition, in the case of the data channel, by repeatedly transmitting the data, the flexibility of using a method for improving the reception quality can be increased compared with the case of the L1/L2 control channel.

For this reason, even when the scheduling information (for example, assignment information for data) transmitted via the L1/L2 control channel cannot be received, the data transmitted via the data channel may be received.

DISCLOSURE OF THE INVENTION

The present invention has been made in view of the foregoing problems. An object of the present invention is to provide a base station and a scheduling method, in which the scheduling method to be used can be switched from the "normal scheduling" to the "persistent scheduling", in accordance with a reception condition of the above-described signaling channel, when the "persistent scheduling" and the "normal scheduling" are used in combination.

A first aspect of the present invention is summarized as a base station, including: a scheduling unit configured to use, for a particular radio bearer, any one of a persistent scheduling in which data addressed to a mobile station is transmitted at a predetermined timing, and a non-persistent scheduling in which a transmission opportunity is assigned to data addressed to a mobile station having a favorable reception condition; a control information generating unit configured to generate control information to be used in the persistent scheduling; a control information notifying unit configured to notify, to the mobile station, the control information; and a switching notifying unit configured to notify, to the mobile station, that a scheduling to be used for the particular bearer should be switched from the non-persistent scheduling to the persistent scheduling, wherein the scheduling unit is configured to switch the scheduling to be used for the particular radio bearer, from the non-persistent scheduling to the persistent scheduling, based on a reception condition of the control information in the mobile station.

In the first aspect of the present invention, the scheduling unit may be configured to switch the scheduling to be used for the particular radio bearer, from the non-persistent scheduling to the persistent scheduling, when a reception quality in the particular radio bearer is determined as equal to or less than a predetermined threshold, based on a measurement signal transmitted from the mobile station and indicating a propagation path condition.

The first aspect of the present invention may include a moving speed detecting unit configured to detect a moving speed of the mobile station based on a pilot signal transmitted from the mobile station, and the scheduling unit may be configured to switch the scheduling to be used for the particular radio bearer, from the non-persistent scheduling to the persistent scheduling, when the moving speed of the mobile station is determined as equal to or higher than a predetermined threshold.

In the first aspect of the present invention, the control information notifying unit may be configured to notify, to the mobile station, the control information to be used in the persistent scheduling, when the particular radio bearer is set.

In the first aspect of the present invention, the control information notifying unit may be configured to notify, to the mobile station, the control information, by an RRC signaling.

In the first aspect of the present invention, the switching notifying unit may notify, to the mobile station, that the scheduling to be used for the particular radio bearer should be switched from the non-persistent scheduling to the persistent scheduling, by an RRC signaling.

In the first aspect of the present invention, the switching notifying unit may be configured to notify, to the mobile station, that the scheduling to be used for the particular radio bearer should be switched from the non-persistent scheduling to the persistent scheduling, as a MAC control PDU.

In the first aspect of the present invention, the scheduling unit may be configured to switch the scheduling to be used for the particular radio bearer, from the persistent scheduling to the non-persistent scheduling, based on the reception condition of the control information in the mobile station.

A second aspect of the present invention is summarized as a scheduling method, including: generating control information to be used for a particular radio bearer in a persistent scheduling in which data addressed to a mobile station is transmitted at a predetermined timing; notifying, to the mobile station, the control information; and notifying, to the mobile station, that a scheduling to be used for the particular radio bearer should be switched, based on a reception condition of the control information in the mobile station, to the persistent scheduling, from a non-persistent scheduling in which a transmission opportunity is assigned to data addressed to a mobile station having a favorable reception condition.

BRIEF DESCRIPTION OF THE DRAWINGS

FIG. 2 is an explanatory view indicating an embodiment of scheduling information.

FIG. 3 is a functional block diagram of the base station according to the embodiment of the present invention.

BEST MODE FOR CARRYING OUT THE INVENTION

Figure 1:
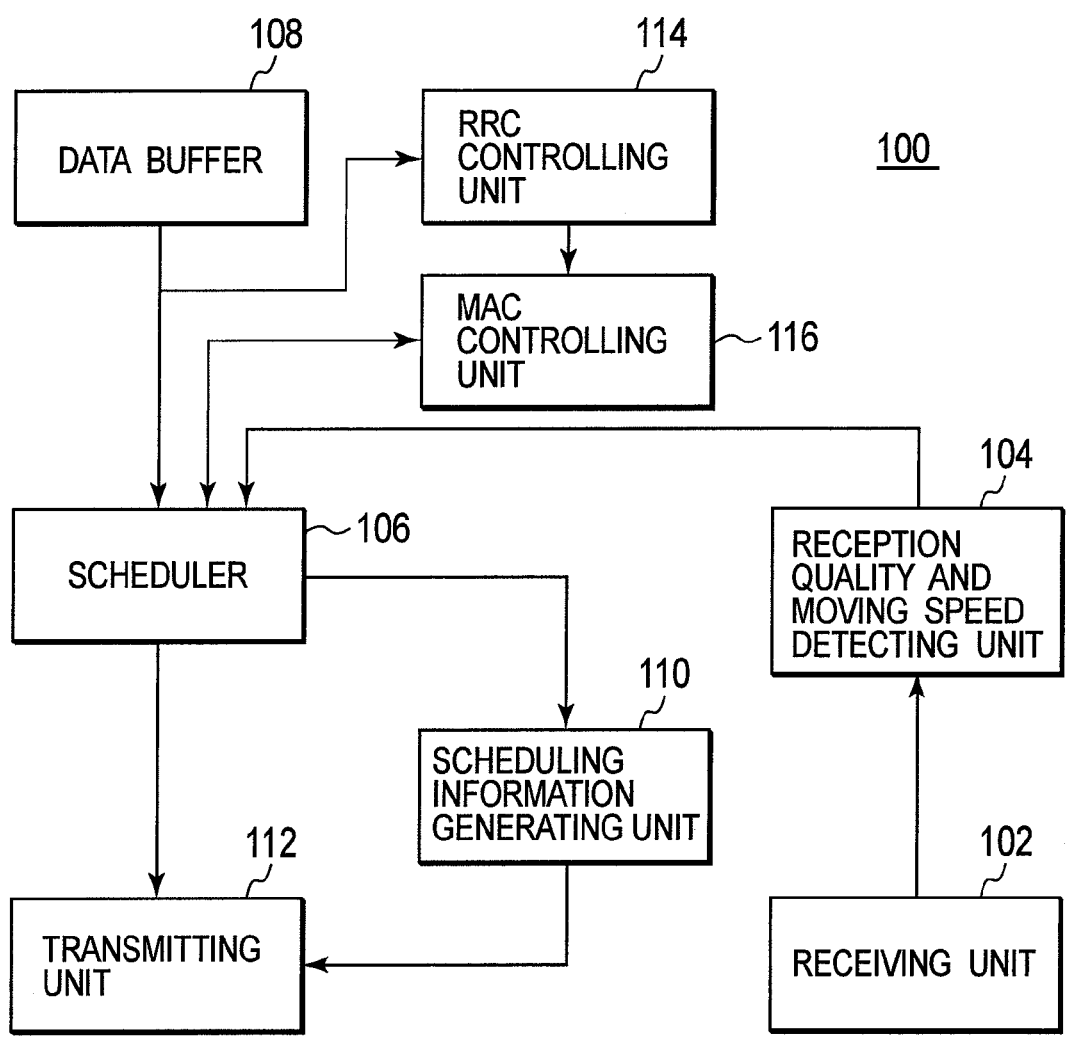
FIG. 1 is a functional block diagram of a base station according to an embodiment of the present invention.

An embodiment of the present invention will be described below by referring to the accompanying drawings. In the drawings for describing this embodiment, same reference numerals are used for components having the same function, and redundant explanation will be omitted.

With reference to FIGS. 1 to 3, a mobile communication system according to the present embodiment will be described below.

The mobile communication system according to the present embodiment includes a base station (eNodeB) 100 and a mobile station 200. The mobile station 200 can perform a radio communication with the base station (eNodeB) 100.

The base station (eNodeB) 100 according to the present embodiment will be described by referring to FIG. 1.

The base station (eNodeB) 100 includes a receiving unit 102, a reception quality and moving speed detecting unit 104, a scheduler 106, a data buffer 108, a scheduling information generating unit 110, a transmitting unit 112, an RRC controlling unit 114, and a MAC controlling unit 116.

The receiving unit 102 is configured to receive a pilot signal and a measurement signal of a propagation path condition (for example, Measurement report, CQI report, or the like), which are transmitted from the mobile station 200, and to input these received signals to the reception quality and moving speed detecting unit 104.

The reception quality and moving speed detecting unit 104 is configured to detect at least one of a reception quality and a moving speed, based on the information inputted by the receiving unit 102.

For example, the reception quality and moving speed detecting unit 104 is configured to estimate the reception quality of the scheduling information in the mobile station 200, based on the SIR measurement report included in the inputted Measurement report.

Here, the Measurement report may include the reception quality of the scheduling information (for example, the number of reception errors, reception error ratio, and the like in the L1/L2 control channel).

In addition, the reception quality and moving speed detecting unit 104 may be configured to estimate the reception quality of the scheduling information in the mobile station 200, based on the inputted CQI report.

Here, CQI (Channel Quality Indicator) unit is referred to as an identifier indicating a communication condition of the radio channel between the base station (eNodeB) 100 and the mobile station 200.

The reception quality and moving speed detecting unit 104 may also be configured to detect a moving speed of the mobile station 200 by obtaining a Doppler spread based on the inputted pilot signal.

The reception quality and moving speed detecting unit 104 is configured to input the detection result to the scheduler 106.

The scheduler 106 is configured to use the "persistent scheduling" and "non-persistent scheduling (normal scheduling)" in combination. Here, the "persistent scheduling" can reduce a transmission frequency of signaling information (scheduling information) transmitted via a signaling channel equivalent to the HS-SCCH in the HSDPA, when the data having a known traffic pattern (such as VoIP or the like) is transmitted. Further, the "non-persistent scheduling" assigns the transmission opportunity to a user (mobile station) having a favorable radio channel condition at each TTI.

The scheduler 106 determines, based on a predetermined condition, that a scheduling to be used should be switched from the "normal scheduling" to the "persistent scheduling." Such determination may be made by the RRC controlling unit 114.

The scheduler 106 may also determine, based on a predetermined condition, that the scheduling to be used should be switched from the "persistent scheduling" to the "normal scheduling." Such determination may be made by the RRC controlling unit 114.

When the scheduler 106 determines that the scheduling to be used should be switched from the "normal scheduling" to the "persistent scheduling," the scheduler 106 instructs the RRC controlling unit 114 to transmit, to the mobile station 200, a switching notification for notifying the mobile station 200 of the above determination.

As described above, there is a case where the reception quality of the scheduling information transmitted via the L1/L2 control channel is temporarily deteriorated greatly owing to such as a shadowing, a high-speed movement, or the like.

In this case, even when a transmission opportunity is assigned to the data addressed to the mobile station by the "normal scheduling," the mobile station cannot receive the scheduling information transmitted via the L1/L2 control channel, and thereby cannot receive the data addressed to the mobile station.

Meanwhile, in a case of a data channel, an error resilience can be enhanced by changing a coding ratio of the data to be transmitted, and, for example, by coding the data at a low coding ratio. In addition, in the case of the data channel, by repeatedly transmitting the data, the flexibility of using a method for improving the reception quality is increased when compared with the case of the L1/L2 control channel. For this reason, even when the scheduling information (for example, assignment information for data) transmitted via the L1/L2 control channel cannot be received, the data transmitted via the data channel may be received.

In this regard, in this embodiment, the "persistent scheduling" is applied for the data other than the data transmitted by the "persistent scheduling" and having a known traffic pattern (the data such as being transmitted by "normal scheduling," having an unknown traffic pattern, and the like), when the mobile station determines that the reception quality of the scheduling information is unfavorable.

In this manner, data can be transmitted without notifying the assignment information of a radio resource by using the scheduling information.

For example, the scheduler 106 determines whether or not the scheduling to be used should be switched from the "normal scheduling" to the "persistent scheduling," based on at least one of the reception quality detection result and the moving speed detection result, which are inputted by the reception quality and moving speed detecting unit 104.

The scheduler 106 may also determine whether or not the scheduling to be used should be switched from the "persistent scheduling" to the "normal scheduling," based on at least one of the reception quality detection result and the moving speed detection result, which are inputted by the reception quality and moving speed detecting unit 104.

Further, when the RRC controlling unit 114 determines whether or not the scheduling to be used should be switched from the "normal scheduling" to the "persistent scheduling," the RRC controlling unit 114 makes this determination by referring to at least one of the reception quality detection result and the moving speed detection result, which are inputted into the scheduler 106 by the reception quality and moving speed detecting unit 104.

In the present embodiment, a description will be given in a case where the scheduler 106 makes the above-described determination. However, the present invention can also be applied to a case where the RRC controlling unit 114 makes the above-described determination. In such case, the RRC controlling unit 114 notifies the scheduler 106 of the determination result.

Specifically, when the reception quality in the L1/L2 control channel (for example, the number of reception errors, reception error ratio, or the like) is determined as equal to or lower than a predetermined threshold, based on the reception quality detection result, the scheduler 106 determines that the reception error ratio of the scheduling information is to be large in the mobile station 100, thereby the scheduling to be used should be switched from the "normal scheduling" to the "persistent scheduling."

Thereafter, when the reception quality in the L1/L2 control channel (for example, the number of reception errors, reception error ratio, or the like) is determined as equal to or higher than a predetermined threshold, based on the reception quality detection result, the scheduler 106 may determine that the reception quality in the L1/L2 control channel is improved in the mobile station 100, and may determine that the scheduling to be used should be switched from the "persistent scheduling" to the "normal scheduling."

In addition, when the moving speed of the mobile station 200 is equal to or higher than a predetermined threshold, based on the f the moving speed detection result, the scheduler 106 determine that the mobile station 200 is moving to an area where a reliability of the scheduling information cannot be secured, thereby the scheduling to be used should be switched from the "normal scheduling" to the "persistent scheduling."

Thereafter, when the moving speed of the mobile station 200 is determined as lower than a predetermined threshold, based on the moving speed detection result, the scheduler 106 may determine that the mobile station 200 unlikely moves to an area where the reliability of the scheduling information cannot be secured, thereby the scheduling to be used should be switched from the "persistent scheduling" to the "normal scheduling."

The scheduler 106 is configured to perform the "persistent scheduling" according to a parameter (to be described later) set in advance in the RRC controlling unit 114, when it is determined that the scheduling to be used should be switched from the "normal scheduling" to the "persistent scheduling." The scheduler 106 may also be configured to perform the "persistent scheduling" according to a parameter (to be described later) determined at a timing when it is determined that the scheduling to be used should be switched from the "normal scheduling" to the "persistent scheduling."

The scheduler 106 may also be configured to suspend performing the "persistent scheduling" and to start performing the "normal scheduling," when it is determined that the scheduling to be used should be switched from the "persistent scheduling" to the "normal scheduling."

The data buffer 108 is configured to store upper layer data therein. The scheduler 106 generates shared channel data from the upper layer data stored in the data buffer 108, and assigns the transmission opportunity to the shared channel data addressed to the mobile station 200.

The scheduling information generating unit 110 generates the scheduling information to be used when the "persistent scheduling" is performed, and notifies, to the mobile station 200, the generated scheduling information through the transmitting unit 112.

For example, as a parameter to be used when the "persistent scheduling" is performed, the scheduling information includes information (control information) relating to a radio resource including at least one piece of information as shown in FIG. 2.

Specifically, such information relating to the radio resource includes: as category 1, "user ID (UE ID)," "resource assignment information (Resource assignment)," and "number of sub-frames (Duration assignment)."

The information relating to the radio resource also includes: as category 2, "multi-antenna related information (Multi-antenna related info)," "modulation scheme information (Modulation scheme)," and "payload size (Payload size)."

Furthermore, the information relating to the radio resource includes: as category 3, "hybrid ARQ process number (Hybrid ARQ process)."

The scheduler 106 may be configured to determine an amount of a radio resource to be assigned, based on, for example, the reception quality result or the moving speed detection result which are inputted by the reception quality and moving speed detecting unit 104 in the "persistent scheduling." Alternatively, the scheduler 106 may be configured to assign a constant amount of a radio resource which is set in advance.

In general, the RRC controlling unit 114 is configured to notify, to the mobile station 200, the scheduling information in which the above-described parameter is set, for the data other than the data transmitted by the "persistent scheduling" and having a known traffic pattern (the data such as being transmitted by the "normal scheduling," having an unknown traffic pattern, and the like).

For example, the RRC controlling unit 114 notifies, to the mobile station 200, the scheduling information relating to a radio bearer, when the radio bearer is set.

The RRC controlling unit 114 is configured to notify a timing in which a transmission opportunity to data is possibly assigned according to the scheduling information (for example, a frame period, that is, a period of transmitting the shared channel).

In addition, the scheduling information may be configured to notify the information indicating a modulation scheme and coding ratio which are to be used, a position of a resource block to be transmitted, or the number of maximum retransmissions of HARQ.

The RRC controlling unit 114 may also be configured to transmit, to the mobile station 200, the scheduling information including the parameter used in the "persistent scheduling," when the scheduler 106 determines that the scheduling to be used should be switched from the "normal scheduling" to the "persistent scheduling."

In addition, when the scheduler 106 determines that the scheduling to be used should be switched from the "normal scheduling" to the "persistent scheduling," the RRC controlling unit 114 transmits, to the mobile station 200, a switching notification for notifying the above determination.

Such switching notification may include information specifying a switching timing of the scheduling to be used.

Such determination may be made by the RRC controlling unit 114. In such case, when it is determined that scheduling to be used should be switched from the "normal scheduling" to the "persistent scheduling," the RRC controlling unit 114 transmits, to the mobile station 200, the switching notification for notifying the above determination.

The MAC controlling unit 116 may also be configured to transmit, to the mobile station 200, the switching notification, as a MAC control PDU. As a result, a receiving side can recognize that the data is to be transmitted, based on the "persistent scheduling." Further, by transmitting such switching notification as the MAC control PDU, the signaling by use of the RRC can be also eliminated.

Next, the mobile station 200 according to the present embodiment will be described by referring to FIG. 3.

The mobile station 200 includes a receiving unit 202, a scheduling information decoding unit 204, a data demodulating and decoding unit 206, an RRC 208, a MAC controlling unit 210, a reception quality measuring unit 212, a quality information generating unit 214, and a transmitting unit 216.

The scheduling information transmitted from the base station 100 is received by the receiving unit 202 and is inputted to the scheduling information decoding unit 204.

The scheduling information decoding unit 204 is configured to decode the inputted scheduling information and to input the decoded scheduling information to the data demodulating and decoding unit 206.

In addition, the scheduling information decoding unit 204 is configured to measure a reception quality of the scheduling information (for example, number of reception errors, reception error ratio, or the like) and to input the measurement result to the reception quality measuring unit 212.

The data transmitted from the base station via the shared channel is received by the receiving unit 202 and inputted to the data demodulating and decoding unit 206.

The data demodulating and decoding unit 206 is configured to perform a decoding process on the data transmitted via the shared channel, based on the scheduling information inputted by the scheduling information decoding unit 204.

A pilot signal transmitted from the base station 100 via a pilot channel is received by the receiving unit 202 and is inputted to the reception quality measuring unit 210.

The reception quality measuring unit 210 is configured to measure a reception quality of the pilot signal and to input the measurement result to the quality information generating unit 212.

In addition, the reception quality measuring unit 210 may be configured to measure the reception quality of the scheduling information (for example, the number of reception errors or the reception error ratio in the L1/L2 control channel, or the like) and to input the measurement result to the quality information generating unit 212.

The quality information generating unit 212 is configured to generate quality information based on the measurement result of the inputted reception quality, and to transmit the generated quality information through the transmitting unit 216.

The RRC 208 sets the scheduling information to be used when the "persistent scheduling" notified from the base station 100 is performed. In other words, the RRC 208 is configured to store the notified scheduling information.

For example, the RRC 208 sets the scheduling information notified when the radio bearer is set. Alternatively, the RRC 208 sets the scheduling information notified when it is determined that the scheduling used in the base station 100 should be switched to the "persistent scheduling."

In addition, when the base station 100 transmits an RRC message including the switching notification for notifying that the scheduling to be used should be switched from the "normal scheduling" to the "persistent scheduling," the RRC 208 transmits the switching notification to the data demodulating and decoding unit 206.

As a result, the data demodulating and decoding unit 206 performs a demodulation process and a decoding process on the data transmitted via the shared channel, according to the scheduling information to be used when the "persistent scheduling," which is set in advance in the RRC 208, is performed.

Alternatively, the data demodulating and decoding unit 206 performs the demodulation process and the decoding process on the data transmitted via the shared channel, according to the scheduling information notified when it is determined that the scheduling used in the base station 100 should be switched to the "persistent scheduling."

When the above-described switching notification is transmitted as the MAC control PDU, the MAC controlling unit 210 transmits the switching notification to the data demodulating and decoding unit 206.

As a result, the data demodulating and decoding unit 206 performs the demodulation process and the decoding process on the data transmitted via the shared channel, according to the scheduling information used when the "persistent scheduling," which is set in advance in the RRC 208, is performed.

Next, an operation of the base station (eNodeB) 100 according to the present embodiment will be described by referring to FIGS. 4 and 5.

Figure 4:
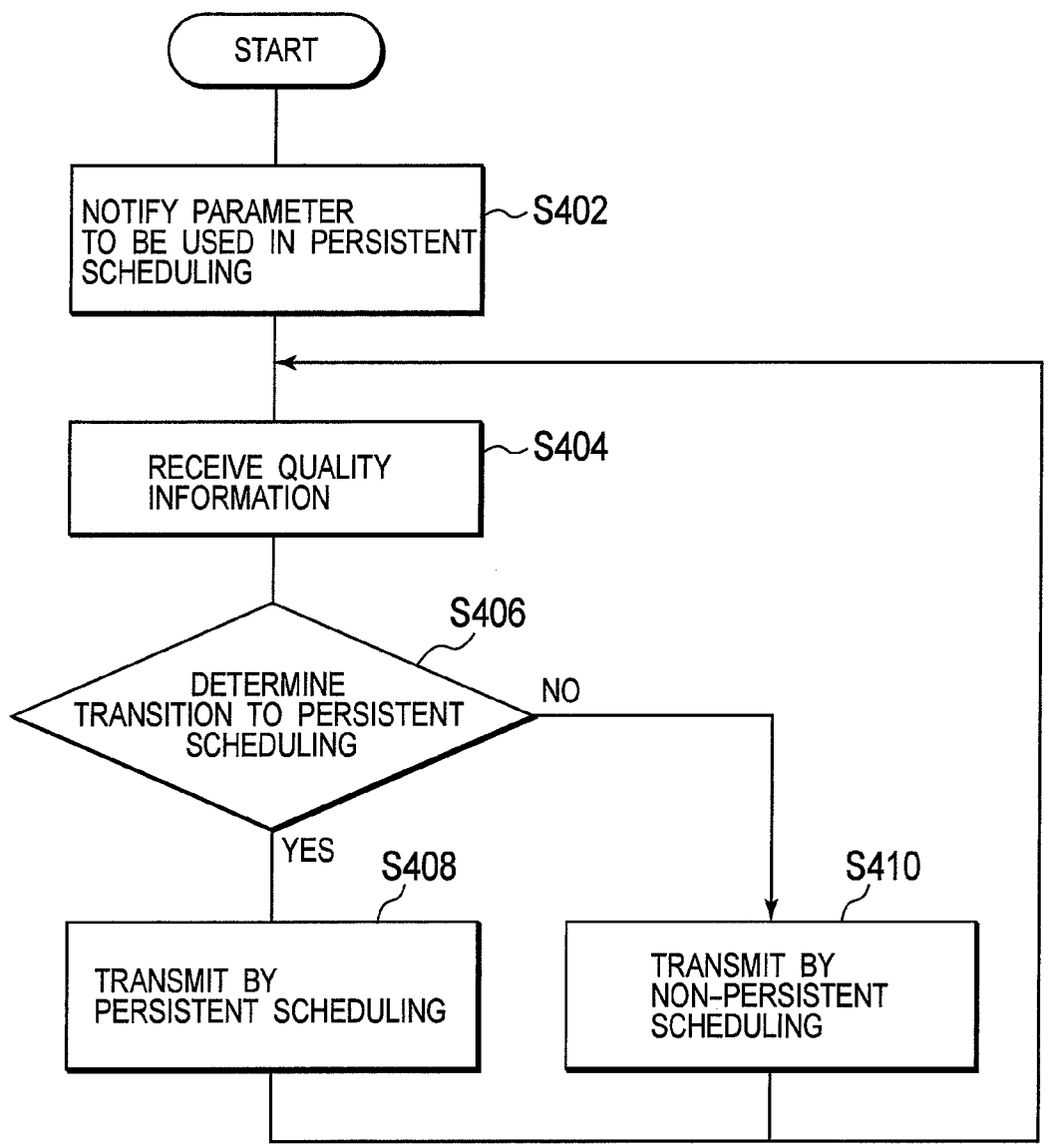
FIG. 4 is a flowchart indicating an operation of the base station according to the embodiment of the present invention.

As shown in FIG. 4, in step S402, the RRC controlling unit 114 generates the scheduling information indicating information (parameter, control information) relating to the radio source to be used when the "persistent scheduling" is performed, and transmits the scheduling information to the mobile station 200.

For example, the RRC controlling unit 114 notifies, to the mobile station 200, the scheduling information, when a radio bearer is set.

Even in a period when the "normal scheduling" is performed, the mobile station 200 performs a reception processing on downlink data transmitted via the shared channel, according to "a period during which data addressed to the mobile station 200 is transmitted via the shared channel" which is notified by the scheduling information. The mobile station 200 also performs a reception processing for the scheduling information, when the scheduling information is transmitted.

In step S404, the receiving unit 102 receives a pilot signal transmitted from the mobile station 200 or a measurement signal of a propagation path (for example, Measurement report, CQI report, or the like).

The Measurement report, the CQI report, or the pilot signal (quality information), which are received by the receiving unit 102, is inputted to the reception quality and moving speed detecting unit 104.

The reception quality and moving speed detecting unit 104 detects at least one of a reception quality and a moving speed based on the quality information inputted by the receiving unit 102, and input it to the scheduler 106.

In step S406, the scheduler 106 determines whether or not the scheduling to be used should be switched from the "normal scheduling" to the "persistent scheduling," based on at least one of the reception quality and the moving speed inputted by the receiving unit 102. Note that, this determination may be made by the RRC controlling unit 114.

When it is determined that the scheduling to be used should be switched from the "normal scheduling" to the "persistent scheduling" (step S406: YES), in step S408, the scheduler 106 transmits downlink data via the shared channel, by the persistent scheduling.

On the other hand, when it is determined that the scheduling to be used should not be switched from the "normal scheduling" to the "persistent scheduling" (step S406: NO), in step S410, the scheduler 106 transmits the downlink data via the shared channel for the non-persistent scheduling, by the normal scheduling.

Figure 5:
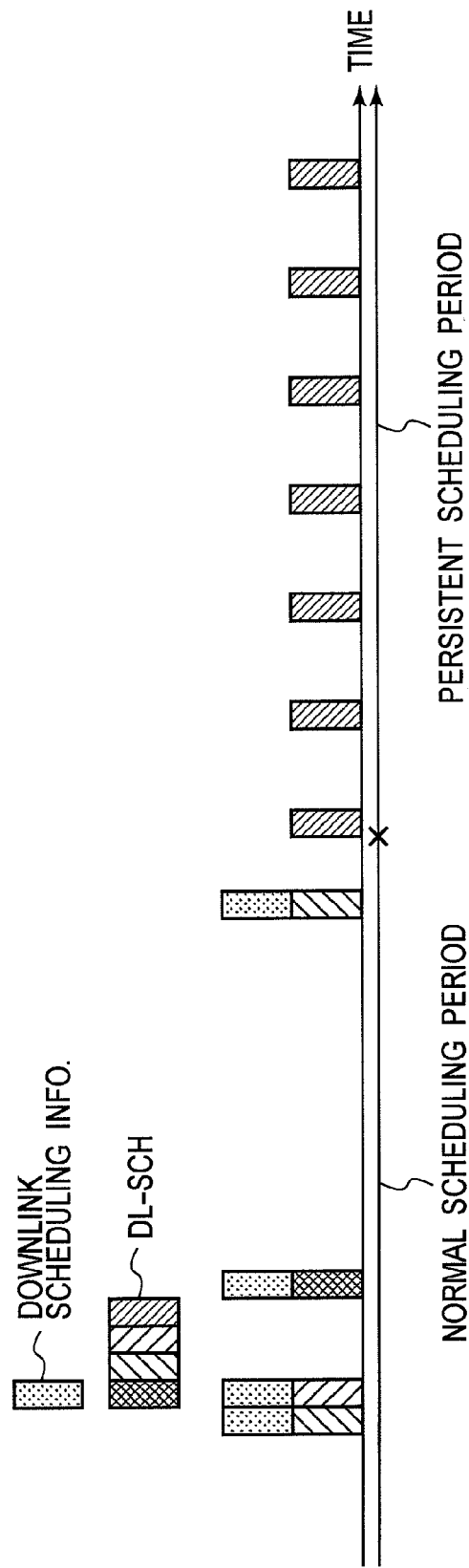
FIG. 5 is a diagram indicating a transmission timing in the base station according to the embodiment of the present invention.

As shown in FIG. 5, in a period of the normal scheduling, radio resource assignment information by the scheduling information (Downlink Scheduling info.) is transmitted via the L1/L2 control channel associated with the shared channel (DL-SCH: Downlink Shared Channel).

In such a normal scheduling period, a modulation scheme, the error coding rate, or the like is appropriately changed by high-speed, depending on a propagation path condition. In other words, an AMC (Adaptive Modulation and Coding) is applied.

Thereafter, when the base station 100 determines that the reception quality of the scheduling information in the mobile station 200 is to be deteriorated, the scheduling to be used is switched from the "normal scheduling" to the "persistent scheduling."

As a result, in a persistent scheduling period, downlink data is transmitted via the shared data channel without transmitting the scheduling information via the L1/L2 control channel associated with the shared channel. In other words, in the persistent scheduling period, downlink data is transmitted with a predetermined format without performing the processing such as the AMC.

In such case, the mobile station 200 performs a modulation process and a decoding process on the downlink data addressed to the mobile station 200, based on the information relating to the radio resource included in the scheduling information notified in advance. In other words, the base station (eNodeB) 100 transmits the downlink data addressed to the mobile terminal 200 according to the modulation scheme or the error correction coding rate, which are set in advance in the scheduling information.

Note that, in the present invention, it may be configured that the "persistent scheduling" can be used in each of multiple logical channels (for example, logical channel for VoIP communication) each multiplexed on the radio bearer.

According to the present embodiment, when the reception quality of the shared control channel (L1/L2 control channel) cannot be secured in the mobile station, the downlink data can be transmitted by switching the scheduling to be used, from the "normal scheduling" to the "persistent scheduling."

MODIFIED EMBODIMENT

An operation of a base station (eNodeB) 100 according to a modified embodiment of the present invention will be described by referring to FIG. 6.

Figure 6:
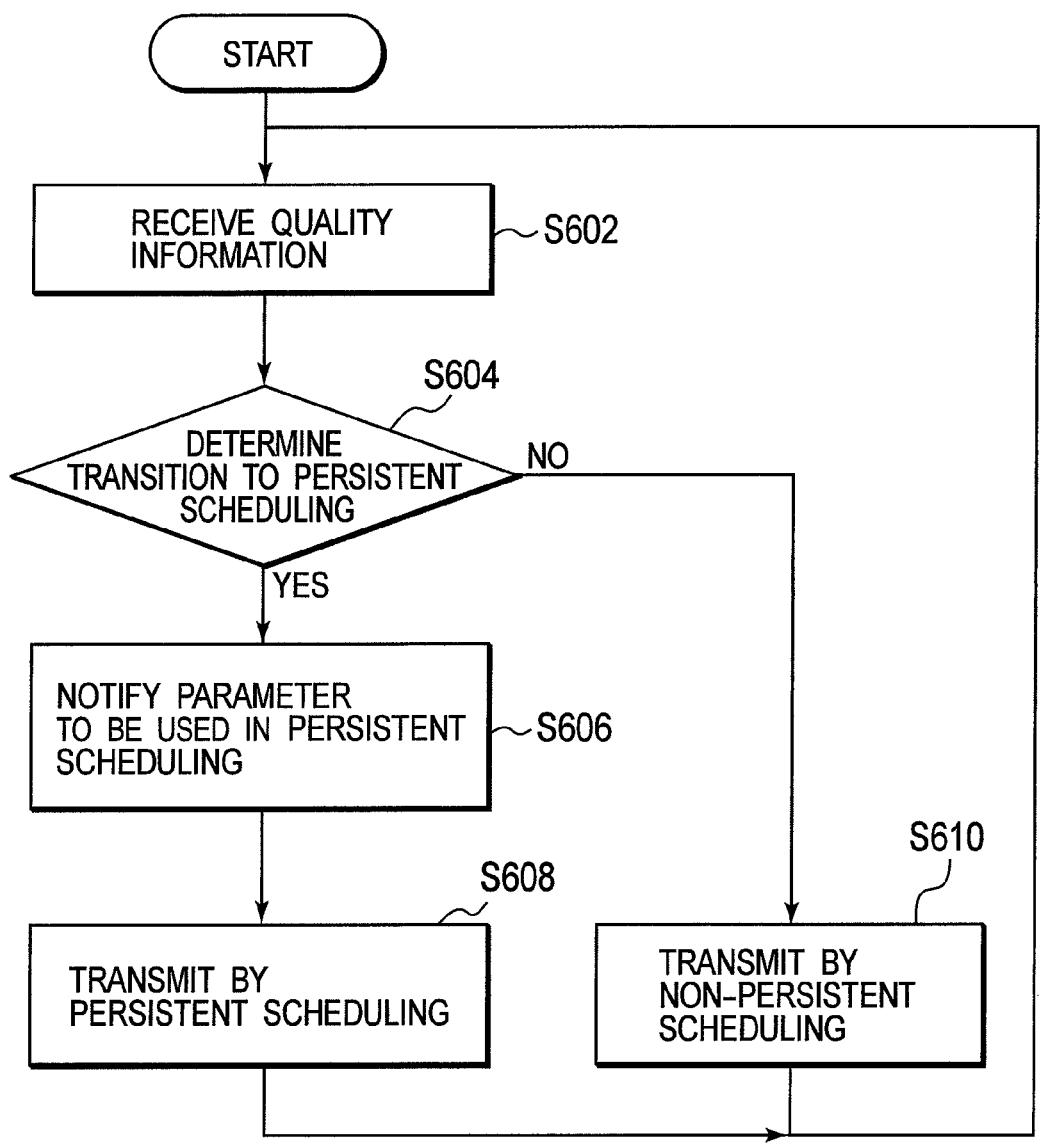
FIG. 6 is a flowchart indicating an operation of the base station according to a modified embodiment of the present invention.

As shown in FIG. 6, in step S602, a receiving unit 102 receives a pilot signal, a measurement signal of a propagation path (for example, Measurement report, CQI report, or the like), which are transmitted from a mobile station 200.

The Measurement report, the CQI report, or the pilot signal (quality information), which are received by the receiving unit 102, are inputted to a reception quality and moving speed detecting unit 104.

The reception quality and moving speed detecting unit 104 detects at least one of a reception quality and a moving speed, based on the quality information inputted by the receiving unit 102, and input it to a scheduler 106.

In step S604, the scheduler 106 determines whether or not the scheduling to be used should be switched from the "normal scheduling" to the "persistent scheduling," based on the at least one of the reception quality and the moving speed, which are inputted by the receiving unit 102. Note that, this determination may be made by an RRC controlling unit 114.

When it is determined that the scheduling to be used should be switched from the "normal scheduling" to the "persistent scheduling" (step S604: YES), in step S606, the RRC controlling unit 114 generates the scheduling information indicating information (parameters, control information) relating to the radio resource to be used when the "persistent scheduling" is performed, and notifies, to the mobile station 200, the generated scheduling information.

In step S608, the scheduler 106 transmits the downlink data via the shared channel, by the persistent scheduling.

In contrast, when it is determined that the scheduling to be used should not be switched from the "normal scheduling" to the "persistent scheduling" (step S604: NO), in step S610, the scheduler 106 transmits the downlink data via the shared channel for non-persistent scheduling, by the normal scheduling.

Note that, the entire content of Japanese Patent Application No. 2006-169437 (filed on Jun. 19, 2006) is incorporated herein by reference.

Also, the entire content of "Ericsson, R1-060099, "Persistent Scheduling for E-UTRA," TSG-RAN WG1 LTE AdHoc, Helsinki, Finland, Jan. 23-25, 2006" is incorporated herein by reference.

Furthermore, the entire content of "QUALCOMM Europe, R1-060173, "Considerations for control signalling support of Real Time Services," 3GPP TSG-RAN WG1 LTE AdHoc, Helsinki, Finland, Jan. 23-25, 2006" is incorporated herein by reference.

Still further, the entire content of "Qualcomm Europe, R2-060550, "Further details on HS-SCCH-less operation for VoIP traffic," 3GPP TSG-RAN WG2 meeting #51, Denver, Colo., USA, Feb. 13-17, 2006" is incorporated herein by reference.

As described above, the present invention has been described in detail by using the above-described embodiment. However, it is clear for a person skilled in the art that the present invention is not limited to the embodiment described herein. The present invention can be implemented as a modified or corrected embodiment without departing from the purpose and scope of the invention which is defined by the description of the scope of claims. Accordingly, the description of the present specification is intended to provide illustrative description and does not have any meaning of limiting the present invention.

INDUSTRIAL APPLICABILITY

As described above, the embodiment of the present invention can provide a base station and a scheduling method, in which the scheduling method to be used can be switched from the "normal scheduling" to the "persistent scheduling", in accordance with a reception condition of the above-described signaling channel, when the "persistent scheduling" and the "normal scheduling" are used in combination.

The invention claimed is:

1. A base station, comprising:
   a scheduling unit configured to use, for a particular radio bearer, any one of a persistent scheduling in which a transmission opportunity is assigned to data addressed to a mobile station per a predetermined period, and a non-persistent scheduling in which a transmission opportunity is assigned to data addressed to the mobile station having a favorable reception condition;
   a control information generating unit configured to generate control information to be used in the persistent scheduling;
   a control information notifying unit configured to notify, to the mobile station, the control information; and
   a switching notifying unit configured to notify, to the mobile station, that a scheduling to be used for the particular radio bearer should be switched from the non-persistent scheduling to the persistent scheduling,
   wherein the scheduling unit is configured to switch the scheduling to be used for the particular radio bearer, from the non-persistent scheduling to the persistent scheduling, based on a reception condition of the control information in the mobile station,
   wherein the scheduling unit is configured to switch the scheduling to be used for the particular radio bearer, from the non-persistent scheduling to the persistent scheduling, when a reception quality in the particular radio bearer is determined as equal to or less than a predetermined threshold, based on a measurement signal transmitted from the mobile station and indicating a propagation path condition:
   wherein the scheduling unit is configured to transmit downlink data via a shared channel based on the persistent scheduling when it is determined that the scheduling to be used should be switched from the non-persistent scheduling to the persistent scheduling, and
   wherein the scheduling unit is configured to transmit the downlink data via the shared channel for the non-persistent scheduling based on a normal scheduling when it is determined that the scheduling to be used should not be switched from the non-persistent scheduling to the persistent scheduling.

2. The base station according to claim 1, comprising: a moving speed detecting unit configured to detect a moving speed of the mobile station based on a pilot signal transmitted from the mobile station, wherein
   the scheduling unit is configured to switch the scheduling to be used for the particular radio bearer, from the non-persistent scheduling to the persistent scheduling, when the moving speed of the mobile station is determined as equal to or higher than a predetermined threshold.

3. The base station according to claim 1, wherein the control information notifying unit is configured to notify, to the mobile station, the control information to be used in the persistent scheduling, when the particular radio bearer is set.

4. The base station according to claim 1, wherein the control information notifying unit is configured to notify, to the mobile station, the control information, by a Radio Resource Control (RRC) signaling.

5. The base station according to claim 1, wherein the switching notifying unit notifies, to the mobile station, that the scheduling to be used for the particular radio bearer should be switched from the non-persistent scheduling to the persistent scheduling, by a Radio Resource Control (RRC) signaling.

6. The base station according to claim 1, wherein the switching notifying unit is configured to notify, to the mobile station, that the scheduling to be used for the particular radio bearer should be switched from the non-persistent scheduling to the persistent scheduling, as a Media Access Control (MAC) control Protocol Data Unit (PDU).

7. The base station according to claim 1, wherein the scheduling unit is configured to switch the scheduling to be used for the particular radio bearer, from the persistent scheduling to the non-persistent scheduling, based on the reception condition of the control information in the mobile station.

8. A scheduling method, comprising:
   generating control information to be used for a particular radio bearer in a persistent scheduling in which a transmission opportunity is assigned to data addressed to a mobile station per a predetermined period;
   notifying, to the mobile station, the control information;
   notifying, to the mobile station, that a scheduling to be used for the particular radio bearer should be switched, based on a reception condition of the control information in the mobile station, to the persistent scheduling, from a non-persistent scheduling in which a transmission opportunity is assigned to data addressed to a mobile station having a favorable reception condition;

switching the scheduling to be used for the particular radio bearer, from the non-persistent scheduling to the persistent scheduling, when a reception quality in the particular radio bearer is determined as equal to or less than a predetermined threshold, based on a measurement signal transmitted from the mobile station and indicating a propagation path condition;

transmitting downlink data via a shared channel based on the persistent scheduling when it is determined that the scheduling to be used should be switched from the non-persistent scheduling to the persistent scheduling; and transmitting the downlink data via the shared channel for the non-persistent scheduling based on a normal scheduling when it is determined that the scheduling to be used should not be switched from the non-persistent scheduling to the persistent scheduling.

* * * * *